United States Patent
De Greyt et al.

(10) Patent No.: US 12,497,572 B2
(45) Date of Patent: Dec. 16, 2025

(54) VERSATILE METHOD FOR PURIFYING GLYCERIDIC MATERIALS

(71) Applicant: DESMET BELGIUM, Zaventem (BE)

(72) Inventors: Wim De Greyt, Sinaai (BE); Antonios Papastergiadis, Veltem-Beisem (BE); Bogumila Wozniak, Berchem (BE)

(73) Assignee: DESMET BELGIUM, Zaventem (BE)

( * ) Notice: Subject to any disclaimer, the term of this patent is extended or adjusted under 35 U.S.C. 154(b) by 568 days.

(21) Appl. No.: 17/920,027

(22) PCT Filed: Apr. 19, 2021

(86) PCT No.: PCT/EP2021/060115
§ 371 (c)(1),
(2) Date: Oct. 20, 2022

(87) PCT Pub. No.: WO2021/213991
PCT Pub. Date: Oct. 28, 2021

(65) Prior Publication Data
US 2023/0134992 A1 May 4, 2023

Related U.S. Application Data

(60) Provisional application No. 63/012,450, filed on Apr. 20, 2020.

(51) Int. Cl.
C11B 3/00 (2006.01)
C11B 3/04 (2006.01)
C11B 3/16 (2006.01)

(52) U.S. Cl.
CPC .............. *C11B 3/001* (2013.01); *C11B 3/008* (2013.01); *C11B 3/04* (2013.01); *C11B 3/16* (2013.01)

(58) Field of Classification Search
CPC ............ C11B 3/001; C11B 3/16; C11B 3/008
See application file for complete search history.

(56) References Cited

U.S. PATENT DOCUMENTS

| | | |
|---|---|---|
| 5,783,068 A | 7/1998 | Laborde et al. |
| 6,551,566 B1 | 4/2003 | Grover et al. |
| 7,511,181 B2 | 3/2009 | Petri et al. |
| 7,691,159 B2 | 4/2010 | Li |
| 7,915,460 B2 | 3/2011 | Kalnes et al. |
| 8,039,682 B2 | 10/2011 | Mccall et al. |
| 8,608,812 B2 | 12/2013 | Perego et al. |
| 8,624,071 B2 | 1/2014 | Vermeiren et al. |
| 8,632,675 B2 | 1/2014 | Cole et al. |
| 8,642,824 B2 | 2/2014 | Lemke et al. |
| 8,648,210 B2 * | 2/2014 | Hujanen ............... C10L 1/1802 554/20 |
| 8,648,224 B2 | 2/2014 | Vermeiren et al. |
| 8,686,203 B2 | 4/2014 | Hanks et al. |
| 8,735,640 B2 | 5/2014 | Cohen et al. |
| 8,742,185 B2 | 6/2014 | Ouni et al. |
| 8,785,701 B2 | 7/2014 | Cole et al. |
| 8,889,932 B2 | 11/2014 | Luetkens, Jr. et al. |
| 8,975,459 B2 | 3/2015 | Vermeiren et al. |
| 9,024,095 B2 | 5/2015 | Knuuttila et al. |
| 9,162,938 B2 | 10/2015 | Mukherjee et al. |
| 9,206,092 B2 | 12/2015 | Ouni et al. |
| 9,216,941 B2 | 12/2015 | Lemke et al. |
| 9,284,515 B2 | 3/2016 | Uptain et al. |
| 9,382,483 B2 | 7/2016 | Knuuttila et al. |
| 9,388,097 B2 | 7/2016 | Wampler et al. |
| 9,574,138 B2 | 2/2017 | Wang et al. |
| 9,617,479 B2 | 4/2017 | Fingland et al. |
| 9,663,720 B2 | 5/2017 | Nousiainen et al. |
| 9,688,919 B2 | 6/2017 | Vilonen et al. |
| 9,783,763 B2 | 10/2017 | Guay et al. |
| 10,023,810 B2 | 7/2018 | Nousiainen et al. |
| 10,071,322 B2 | 9/2018 | Coppola et al. |
| 10,087,374 B2 | 10/2018 | Mukherjee et al. |
| 10,144,880 B2 | 12/2018 | Greene et al. |
| 10,144,881 B2 | 12/2018 | Mukherjee et al. |
| 10,358,605 B2 | 7/2019 | Camper |
| 10,385,278 B2 | 8/2019 | Ouni et al. |
| 10,450,518 B2 | 10/2019 | Coppola et al. |
| 10,501,693 B2 | 12/2019 | Laakkonen et al. |
| 10,604,712 B2 | 3/2020 | Narine et al. |
| 10,696,920 B2 | 6/2020 | Toukonitty et al. |
| 10,738,264 B2 | 8/2020 | Bergström et al. |
| 10,815,428 B2 | 10/2020 | Nousiainen et al. |
| 10,815,430 B2 | 10/2020 | Gutierrez et al. |
| 10,941,349 B2 | 3/2021 | Jakkula et al. |
| 10,941,355 B2 | 3/2021 | Coppola et al. |
| 10,947,478 B2 | 3/2021 | Björklöf et al. |
| 10,954,451 B2 | 3/2021 | Ouni et al. |
| 11,028,336 B2 | 6/2021 | Malm et al. |
| 11,053,452 B2 | 7/2021 | Gutierrez et al. |
| 11,781,075 B2 | 10/2023 | Coppola et al. |
| 2010/0286453 A1 | 11/2010 | Palauschek et al. |

(Continued)

FOREIGN PATENT DOCUMENTS

| | | |
|---|---|---|
| CA | 2 767 208 A1 | 2/2011 |
| EP | 0 728 175 B1 | 11/1999 |

(Continued)

OTHER PUBLICATIONS

International Search Report for International Application No. PCT/EP2021/060115, dated Aug. 2, 2021.

(Continued)

*Primary Examiner* — Yate' K Cutliff
(74) *Attorney, Agent, or Firm* — Birch, Stewart, Kolasch & Birch, LLP

(57) ABSTRACT

The invention provides a method for the purifying of low-quality glyceridic material usually unfit for use as feed or food. The method includes a thermal treatment of the low-quality glyceridic material and chemical treatments. The purified oils and fat are suitable feed-stock or suitable components thereof for a hydrogenation processes yielding to high quality renewable diesel. The process thus permits the recycling of waste material that is usually discarded, into a valuable high-quality fuel.

15 Claims, No Drawings

(56) References Cited

U.S. PATENT DOCUMENTS

| | | |
|---|---|---|
| 2012/0116103 A1 | 5/2012 | Hujanen et al. |
| 2014/0275688 A1 | 9/2014 | Weigel et al. |
| 2015/0353864 A1 | 12/2015 | Vermeiren et al. |
| 2018/0010051 A1 | 1/2018 | Lindqvist et al. |
| 2019/0338200 A1 | 11/2019 | Slade et al. |
| 2020/0040278 A1 * | 2/2020 | Malm ................. C11B 3/008 |
| 2020/0339911 A1 | 10/2020 | Pasanen et al. |
| 2021/0040396 A1 | 2/2021 | Cohen et al. |
| 2021/0198584 A1 | 7/2021 | Vermeiren et al. |
| 2021/0207041 A1 | 7/2021 | Vermeiren et al. |
| 2023/0287281 A1 | 9/2023 | Suntio et al. |
| 2023/0323214 A1 | 10/2023 | Byman et al. |
| 2023/0323215 A1 | 10/2023 | Lindqvist et al. |
| 2023/0323242 A1 | 10/2023 | Lehtimaa et al. |
| 2024/0026233 A1 | 1/2024 | Coppola et al. |
| 2024/0026235 A1 | 1/2024 | Sandberg et al. |
| 2024/0199963 A1 | 6/2024 | Coustham et al. |
| 2024/0209267 A1 | 6/2024 | Paasikallio et al. |
| 2024/0209268 A1 | 6/2024 | Toukoniitty et al. |

FOREIGN PATENT DOCUMENTS

| | | | |
|---|---|---|---|
| EP | 1 728 844 A1 | 12/2006 | |
| EP | 2 290 034 A1 | 3/2011 | |
| EP | 2 855 638 B1 | 7/2015 | |
| EP | 2 084 245 B1 | 3/2018 | |
| EP | 2 229 430 B1 | 4/2019 | |
| EP | 2 956 530 B1 | 4/2019 | |
| EP | 3 112 444 B1 | 6/2019 | |
| EP | 2 307 522 B1 | 11/2019 | |
| EP | 3 620 500 B1 | 10/2020 | |
| EP | 3 149 134 B1 | 12/2020 | |
| EP | 3 607 027 B1 | 1/2021 | |
| EP | 3 601 247 B1 | 3/2021 | |
| EP | 3 902 898 B1 | 1/2023 | |
| WO | WO-2018060324 A1 * | 4/2018 | ............. B01D 21/02 |
| WO | WO-2019129933 A1 * | 7/2019 | ............. C10G 31/06 |
| WO | WO 2019/229035 A1 | 12/2019 | |
| WO | WO 2019/229072 A1 | 12/2019 | |
| WO | WO 2021/204817 A1 | 10/2021 | |
| WO | WO 2022/234225 A1 | 11/2022 | |
| WO | WO 2023/002092 A1 | 1/2023 | |
| WO | WO 2023/025755 A1 | 3/2023 | |
| WO | WO 2023/025756 A1 | 3/2023 | |
| WO | WO 2023/031511 A1 | 3/2023 | |
| WO | WO 2023/031513 A1 | 3/2023 | |
| WO | WO 2023/067069 A1 | 4/2023 | |
| WO | WO 2023/126478 A1 | 7/2023 | |
| WO | WO 2023/126561 A1 | 7/2023 | |
| WO | WO 2023/126562 A1 | 7/2023 | |
| WO | WO 2023/126563 A1 | 7/2023 | |
| WO | WO 2023/126564 A1 | 7/2023 | |
| WO | WO 2023/126565 A1 | 7/2023 | |
| WO | WO 2023/126587 A1 | 7/2023 | |
| WO | WO 2023/244525 A1 | 12/2023 | |
| WO | WO 2024/003459 A1 | 1/2024 | |
| WO | WO 2024/013424 A1 | 1/2024 | |
| WO | WO 2024/013427 A1 | 1/2024 | |
| WO | WO 2024/013429 A1 | 1/2024 | |
| WO | WO 2024/013430 A1 | 1/2024 | |
| WO | WO 2024/074759 A1 | 4/2024 | |
| WO | WO 2024/079387 A1 | 4/2024 | |
| WO | WO 2024/134009 A1 | 6/2024 | |
| WO | WO 2024/134021 A1 | 6/2024 | |

OTHER PUBLICATIONS

Written Opinion of the International Searching Authority for International Application No. PCT/EP2021/060115, dated Aug. 2, 2021.

* cited by examiner

VERSATILE METHOD FOR PURIFYING GLYCERIDIC MATERIALS

CROSS-REFERENCE TO RELATED APPLICATION

This application is a national phase entry of International Patent Application No. PCT/EP 2021/060115, filed Apr. 19, 2021, which claims priority to U.S. Provisional Patent Application Ser. No. 63/012,450, filed Apr. 20, 2020, and titled VERSATILE METHOD FOR PURIFYING GLYCERIDIC MATERIALS, all of which are herein incorporated by reference in their entireties.

FIELD OF INVENTION

The disclosed technology generally relates to a method for purifying glyceridic materials, such as, for example low-quality oils and fats or blends thereof that are generally unfit for use as feed or food. More particularly, the method includes a thermal treatment of the glyceridic material, and one or more standard refining treatment(s) typically applied in the field of edible oil refining. The purified glyceridic material is, for example, a suitable feedstock for specific hydrogenation processes yielding to high quality renewable diesel. Consequently, the present technology permits the recycling of waste materials (that are usually discarded) into a valuable high-quality fuel. Alternatively, the purified glyceridic material may be suitable for other oleo-chemical processes as well.

BACKGROUND OF THE INVENTION

During the last decade, in many countries, biodiesel has been blended in diesel as an attempt to reduce our dependency to petroleum-based fuels and equally as an attempt to alleviate the global warming caused by greenhouse gas emissions. Biodiesel is composed of fatty acid methyl esters (FAME) and synthesized by interesterification from glyceridic material and methanol. The glyceridic material is usually vegetable oil, but animal fat is also used, even if much less frequently. This interesterification reaction is predominantly catalyzed with an alkaline catalyst.

However, usage of FAME biodiesel raised several concerns related to ethics, manufacturing, and product performances. Indeed, FAME biodiesel raises ethical concerns, because frequently, food-grade vegetable oils are used to produce it, hence, potentially inflating the price of food. Furthermore, FAME biodiesel raises manufacturing concerns, because free fatty acids (FFA) naturally present in crude vegetable oil must be fully removed prior to the interesterification reaction. Indeed, such FFA neutralize, thus destroying the expensive alkaline catalyst, and furthermore, create soaps complicating the process due to their emulsifying properties.

The complete removal of FFA requires a physical refining, which is a costly and energy intensive process. Consequently, highly degraded oils are usually not preferred as feedstock to produce FAME biodiesel because such highly degraded oils contain too much FFA, which would require a large energy input to remove them. Thus, in practice, the production of FAME biodiesel requires a relatively good quality feedstock (in fact food-grade oils in most instances) and low-quality oils or fats such as waste cooking oils and fats, acid oils obtained from soap-stock splitting, or low-quality animal fats obtained by rendering are not used to produce FAME biodiesel.

Finally, FAME biodiesel raises product performances concerns, because FAME biodiesel cannot be blended in high amount in standard diesel without deleterious effect on modern diesel engines. Issues include, for example, fuel filter clogging at low temperature due to the presence of wax and other solids, and bacteriological contamination in tank since biodiesel is both biodegradable and able to dissolve enough water to support bacterial growth. This last problem also leads to fuel filter clogging and arises mostly in hot and humid climates.

Those concerns have led to the development of hydro-generated biodiesel where glyceridic oils or fats, from animal or vegetable origin, are reduced by hydrogen in presence of a catalyst to yield various hydrocarbons as main product, and propane, water and carbon dioxide as co-products (JP2009138144). The produced hydrocarbons are chemically similar to petrol-based diesel and raise no quality concern at all. They can be blended in any proportion in petrol-based diesel without affecting adversely any of its properties (*Hydrotreated vegetable oil (HVO)—premium renewable biofuel for diesel engines*, Neste oil Proprietary publication for public use, February 2014).

The hydrogenation reaction indistinctively converts triglycerides, partial glycerides, glycerol and FFA as well, and thus, the FFA do not need to be removed from the glyceridic feedstock. Therefore, this technology permits the conversion of highly degraded glyceridic material containing high concentration of FFA such as waste cooking oils or low-quality animal fats obtained from rendering of animal carcasses. Since those highly degraded glyceridic materials are not food/feed grades, their conversion in fuel raises no ethical issues. In the field, hydro-generated biodiesel is usually designated as "green diesel" or "renewable diesel". The latter designation will be used in this description.

However, the catalyst used for the production of renewable diesel is deactivated by the presence, in the glyceridic feedstock, of elements such as Na, Ca, Mg, Fe, P, K, already for concentration in excess of a few ppm. Therefore, the specifications of the glyceridic feedstocks used in the hydrotreatment are very strict concerning the concentration of those elements. The current stricter specifications of one of the producers of renewable diesel states that the phosphorus concentration should not exceed 1 ppm, and the totality of all metal elements (i.e. the sum of Na, Ca, Mg, Fe, K) should not exceed 3 ppm. The specifications of other producers of renewable diesel are less strict, but still low concentration of P and metals are required. In practice, various glyceridic feedstocks are blended to reach the best compromise between all the contaminants and/or blended with vegetable oil of relatively good quality having very low contaminations level, and/or sometimes they may even be blended in crude petroleum oil.

Currently, low quality glyceridic material, such as animal fats obtained from rendering of off spec animal tissues, or from recycling, can be purified in several steps including a physical refining consisting in an FFA stripping, which is common technical knowledge in the field. The first step of this purification procedure includes a water washing or a water degumming to obtain a semi-purified glyceridic material sufficiently low in phosphorus and other elements to be suitable to be processed in a steam stripper vacuum column in order to remove the FFA. The stripped glyceridic material is then usually acid degummed and bleached one or several times in order to meet the final purity specifications. The FFA that have been removed during the stripping step are relatively pure since distilled and can be reintroduced into the partially purified feedstock. This process is efficient and has the advantage of using known refining methods used in the field of the edible oil refining. However, it requires large capital investment and the steam stripping step is energy demanding. The necessity to remove the FFA with a stripping step is, in the case of animal fats of low quality, particularly energy intensive because of the typical large FFA concentration found in such degraded glyceridic materials. Indeed, typically low-quality animal fats contain more than 20% of FFA, and thus require large amount of stripping steam. On the contrary, high quality animal fats are refined very easily with a simple water degumming followed by bleaching and if needed a deodorization. A very similar procedure is applied to some good quality edible vegetable oils, such as palm oil for example.

Therefore, alternative processes, that do not require the stripping of the FFA have been proposed to refine low quality glyceridic materials. However, those alternative methods do not make use of the standard purification techniques used in the field of edible oils and fats.

U.S. Pat. No. 8,648,210 describes a method for the purification of lipid feedstock originating from biological material (such as vegetable oil, animal fats, algae oil) containing large amount of impurities, in particular, large amount of phosphorus and metals, such as Na, K, and Fe. In this method, the lipid feedstock comprising acylglycerols and phosphorus impurities is mixed with at least one nonpolar solvent and at least one polar solvent, and introduced into a reaction zone whereby at least a two phases system comprising a nonpolar phase and a polar phase is formed. The mixture is heated in the closed reaction zone under mixing at a temperature from 150° C. to 300° C. and at a pressure wherein said solvents are in subcritical state, preferably of below 100 bar, depending on the vapor pressure of the selected solvents, until the phosphorus impurity is removed from the polar phase. Subsequently, the nonpolar phase including the purified oil comprising acylglycerols is separated and recovered from said phases system. This method is not derived from the standard refining techniques used in the field of edible vegetable oil refining, and is very efficient to remove the problematic impurities even from heavily contaminated starting lipid materials. However, it requires large amount of nonpolar solvent such as heptane, and large amount polar solvent (water). As a matter of fact, the most efficient purification condition requires a lipid:polar-solvent:water ratio of 1:3:3. Furthermore, for efficient purification, alcohol (such as ethanol) is added to the water, which complicates the recycling of the solvent. It must be noted that all the removed contaminants concentrate in the water. The disposal of such large volume of contaminated water being problematic in most cases. The method is also energy intensive, since large volumes of liquid are heated at high temperature and under high pressure which furthermore requires specific reactors withstanding such high pressure. Even if efficient, it is likely that refiners of edible oils and fats will be reluctant to rely on such technology. Therefore, there is a need for a method that is less energy intensive, that uses no or at least considerably less solvent, and that relies more on the standard refining processes used in the field of edible oils and fats refining.

WO 2018/060324A1 describes a method for purifying lipid material, characterized in that the method comprises the following steps: a) storing the lipid material in a settling tank at elevated temperature, b) allowing the impurities to settle to the bottom of the settling tank to thereby form an oily sludge phase, c) separating the formed oily sludge phase from the rest of the lipid material, d) further processing the lipid material, e) purifying said separated oily sludge phase from impurities, and optionally, f) returning the purified oil from the purifying step e) to said settling tank, wherein the method is characterized in that step e) comprises a heat treatment step comprising the steps of; i. heating said oily sludge phase to a temperature of from about 150° C. to about 300° C., ii. adding polar solvent to said oily sludge phase for removal of impurities from oil phase such as e.g. phosphorus or calcium compounds, and iii. separating and recovering purified oil. This method requires a long settling time from at least 5 hours to several days, which is not practical in industrial environment. Furthermore, this method still requires the use of a large quantity of polar solvent that will generate unconventional waste stream(s). It is likely that refiners of edible oils and fats will be reluctant to rely on such technology. Therefore, there is a need for a method that uses less polar solvent and that relies more on the standard refining processes used in the field of edible oils and fats refining.

Therefore, despite the merits of the prior art, there remains a need for a new purification process of low-quality glyceridic materials requiring no FFA stripping and relying on the standard method used in the field of edible oils and fats, involving the minimal use of chemicals or solvent, generating waste streams of the type already generated by the edible oil industry, and requiring minimal additional investments. The new purification process should be expedited rapidly, typically in less than a work shift, and should be put in practice easily in facilities normally dedicated to the refining of edible vegetable oil. In such conditions, the refiners of edible oils will be able to maintain their activities all year long and will decrease their dependency to the harvesting season.

OBJECT OF THE INVENTION

It is an object of the invention to provide a new purification method of low-quality glyceridic material using conventional techniques, equipment, and chemicals used in the field of edible oils and fats, and/or used in the field of edible animal fat refining, such as, but not limited to, water washing, degumming, bleaching, but that which does not require a costly and energy intensive FFA stripping step. Consequently, no substantial investment is needed for existing edible oils refiners wanting to purify low-quality glyceridic material.

It is an additional object of the invention to provide a purification method of low-quality glyceridic material requiring no solvent, minimal amount of water, and limited energy input.

It is an additional object of the invention to provide a purification method of low-quality glyceridic material wherein waste streams volumes are minimized and can be recycled, and/or disposed using the standard outlets of the edible vegetable oil refining industry.

It is an additional object of the invention to provide a purification method of low-quality glyceridic material yielding to a purified glyceridic material meeting or at least approaching the targeted specifications while still being economically attractive. As a matter of fact, for some low-quality feedstock, it can be more economically advantageous to realize a partial purification, and to blend this partially purified feedstock with another feedstock of higher purity so that overall, the blend meets the target specifications. As a matter of fact, one must realize that typically, renewable diesel production units are processing purified low-quality glyceridic material blended with vegetable oils of better quality. The blend may reach the targeted purity specifications even if one of its components is out of specifications. This blending procedure allows for the utilization of a feedstock that would have been discarded as a waste.

SUMMARY OF THE INVENTION

In one aspect of the disclosed technology, the technology generally provides for a method for the purification of low-quality glyceridic material yielding a purified glyceridic material, said low-quality glyceridic material containing triglycerides, partial glycerides, free fatty acids (FFA), P, Na, K, Mg, Ca, and Fe, said purification process including: (a) a thermal treatment of the low-quality glyceridic material at a temperature of at least 160° C., to yield a thermally treated low-quality glyceridic material, (b) allowing to cool the thermally treated low-quality glyceridic material of step a) at a temperature of 120° C. or lower to yield a cooled thermally treated low-quality glyceridic material, and (c) applying one or more standard refining technique(s) to said cooled thermally treated low-quality glyceridic material of step b), characterized in that said thermal treatment does not lower the concentration of FFA of said low-quality glyceridic material.

In some embodiments, said standard refining technique(s) belong(s) to the field of the refining of edible vegetable oil or to the field of the refining edible animal oil.

In some embodiments, said standard purification techniques are able to remove at least 90% of the phosphorus and at least 95% of the sum of elements Na, K, Mg, Ca and Fe.

In some embodiments, the purified glyceridic material is a suitable material for the production of renewable diesel.

In some embodiments, said thermal treatment of the low-quality glyceridic material is occurring in absence of any solvent and further in absence of any reactant.

In some embodiments, said thermal treatment includes heating the low-quality glyceridic material at a temperature ranging from 160° C. to 300° C., preferably at a temperature ranging from 180° C. to 280° C., even more preferably at temperature ranging from 200° C. to 260° C.

In some embodiments, said thermal treatment of the low-quality glyceridic material is realized during a period of time ranging from 5 minutes to 120 minutes, preferably ranging from 10 to 60 minutes, even more preferably ranging from 15 to 30 minutes.

In some embodiments, said thermal treatment of the low-quality glyceridic material is realized in a hermitical vessel under adiabatic pressure.

In some embodiments, said thermal treatment of the low-quality glyceridic material is realized in a hermitical vessel under a pressure ranging from 100 mbar to 10 bar, preferably ranging from 200 mbar to 8 bar and even more preferably ranging from 400 mbar to 6 bar.

In some embodiments, said thermal treatment of the low-quality glyceridic material is realized under a rotating mechanical agitation having a frequency ranging from 0.01 to 100 hertz, preferably ranging from 0.1 to 80 hertz, even more preferably ranging from 1 to 60 hertz.

In some embodiments, the low-quality glyceridic material is at least partially water washed prior said thermal treatment.

In some embodiments, the low-quality glyceridic material is at least partially washed with an aqueous acidic solution prior said thermal treatment.

In some embodiments, the low-quality glyceridic material is at least partially degummed prior to said thermal treatment.

In some embodiments, said one or more standard refining technique(s) include water washing, acidulated water washing, water degumming, acid degumming, bleaching realized with bleaching agent(s) such as bleaching earth and/or silica and/or activated carbon.

In some embodiments, said low-quality glyceridic material contain at least 5% of FFA, preferably at least 10% of FFA, even more preferably at least 20% of FFA.

In some embodiments, said low-quality glyceridic material contain at least 500 ppm of alkalinity, preferably at least 200 ppm of alkalinity, said alkalinity being defined at the sum of Na, K, Mg, Ca and Fe.

In some embodiments, said purification includes a filtration step, said filtration step removing solid particles such as, but not limited to HDPE particles.

In some embodiments, said filtration includes a filter aid.

In some embodiments, said low-quality glyceridic materials include waste oils or fats of vegetable or animal origins, recycled oils or fats of vegetable or animal origins, rendered animal fats, acid oils.

Definitions

Low-quality glyceridic material: In the context of the presently disclosed technology, the terms "low quality glyceridic material" refer to materials containing triglycerides, partial glycerides, glycerol and free fatty acids and various contaminants in particular phosphorus (P) and metals such as Na, K, Mg, Ca, and Fe. Low-quality glyceridic material are, for example, but not limited to, derived from vegetal, animal, algae or bacteria (or blends thereof) and are usually not suitable for use in food and/or feed. Those materials can result, for example, but not limited to, from the rendering of animal tissues, carcasses of death animals, from waste cooking oils and fats, from recycling, from oils recovered from soap stocks splitting (acid oils) or from any off-spec and degraded vegetable oils. If no suitable technical application is found, those low-quality glyceridic material are considered as a waste and must be discarded at a cost and this disposal may be detrimental for the environment. The composition of those low-quality glyceridic feedstock varies greatly depending on the sources and on the extraction techniques used, but usually they contain large concentration of phosphorus (from about 100 to about 3000 ppm), large concentration of metals such as Na, K, Mg, Ca, and Fe (from about 500 to about 2500 ppm), and large concentration of FFA (from about 5% to about 60%). However, those concentrations are indicative, and the present invention may be beneficial for any low-quality glyceridic material regardless of its contamination level. As a matter of fact, the invention is also advantageous for raw vegetable oils that become edible after their refining. Such raw vegetable oils are explicitly included in the definition of low-quality glyceridic material. The denomination "raw vegetable oils" includes for example soybean oil, palm oil, sunflower oil and rapeseed oil. Those raw vegetables may directly result from the extraction of oleaginous vegetable materials or may have undergone one or more basic purification step(s) such as a filtration and/or a water washing for example. Similarly, raw animal fats that become edible after their refining are also explicitly included in the definition of low-quality glyceridic material. Those raw animal fats may directly result from a rendering operation or may have undergone one or more basic purification step(s) such as a filtration and/or a water washing for example.

Standard refining techniques: In the context of the presently disclosed technology, the terms "standard refining techniques" refer to the refining techniques used in the edible vegetable oil industry, such as, but not limited to, water washing, water degumming, acid degumming, and bleaching. Water and acid degumming are able to remove the phosphorous and various alkaline metals from edible oil. Bleaching is used to remove, at least partially, pigments as well as last traces of phosphorous and various alkaline metals as well as solids particles. Acid degumming usually includes citric acid or eventually phosphoric acid, or more rarely, sulphuric or hydrochloric acid. The bleaching consists in contacting the oil with an adsorbent such as bleaching earth and/or silica and/or activated carbon. Those standard refining techniques are well known by the artisan, in particular, the usual concentration of any chemicals and the condition of those techniques such as the temperature, duration, agitation and the like. In the context of the presently disclosed technology, it is understood that those standard refining techniques can be modified slightly, for example, but not limited to, being applied for a longer time and/or at higher temperature and/or using more reactants, but, still in the context of the presently disclosed technology, the same equipment and the same reactants and chemicals will be used. The same separation technique will be used as well, such as, for example, centrifuge separator, decanter, or filter. Standard refining techniques are extensively described in recognized references, such as, for example, "The lipid Handbook", $3^{rd}$ Edition, CRC Press, 2007, or "Bailey's Industrial oil and fat products", Wiley-Interscience, 2005, or the publications of AOCS (American Oil Chemists' Society) available on-line and as hard copies. Such references are well known by skilled artisans and recognized internationally. Even if those references are older than 10 years, they are still valid since unit operations in the edible oil industry did not change drastically the past decade.

Feedstock for renewable diesel hydrotreatment units: In the context of the presently disclosed technology, the terms "feedstock for renewable diesel hydrotreatment units" mean an oil or fat of animal or vegetal origin or blend thereof that is sufficiently purified, in particular having a P concentration of 4 ppm or less and a global metal concentration of 10 ppm or less (global metal concentration being the sum of the respective concentrations of Na, K, Mg, Ca, Fe). As a matter of fact, several purity specifications exist according to the type of renewable diesel hydrotreatment units. It must be pointed out that a feedstock for renewable diesel hydrotreatment unit is generally not suitable for FAME biodiesel production unit using alkaline catalyst because its concentration in FFA exceeds by several orders of magnitude the tolerable limits for its alkaline catalyst.

DETAILED DESCRIPTION OF EXEMPLARY EMBODIMENTS

The disclosed technology is particularly advantageous to purify low-quality glyceridic material, such as oils and fats derived from animals, plants, bacteria, and/or algae, or obtained from recycling waste oils and fats into a feedstock suitable for a hydrodeoxygenation process wherein glyceridic materials contained in those purified low quality oils and fats are reduced in the presence of hydrogen and a hydrogenation catalyst. The hydrodeoxygenation process transforms glycerides into a mixture containing alkanes and alkenes very similar to diesel fuel obtained from crude petroleum. Side products of this reaction are propane, carbon dioxide and water, which are removed from the alkanes and alkenes mixture. The purified feedstock obtained by the presently disclosed technology may be used pure for such hydrodeoxygenation process or blended in any proportion with other glyceridic materials, such as, for example, refined vegetable oils and/or with non-glyceridic material, such as, crude or partially refined petroleum oil.

Alternatively, the purified glyceridic material obtained according to the presently disclosed technology may be employed in any oleochemical processes, including, for example, the production of FAME obtained by acid catalysis, lubricants synthesis, surfactants synthesis, fatty alcohols synthesis, pharmaceutical, or cosmetic products synthesis.

Alternatively, the process according to the disclosed technology may prove advantageous to purify vegetable oils and/or fats into edible products.

This description focuses on the results relative to the removal of phosphorus, and metals (Ca, Mg, Na, K and Fe) from glyceridic material because the removal of those elements is the most critical for the preservation of the catalyst used for the production of renewable diesel. However, the presently disclosed technology may be advantageous for the removal of other elements and impurities as well.

The description is based on the results obtained for numerous purification trials of three different low-quality glyceridic materials obtained from large scale industrial rendering facilities located respectively in Belgium, France, and The Netherlands. Those glyceridic materials are respectively designated Sample 1, Sample 2, and Sample 3. All those samples are non-edible animal fats and are representative of the low-quality glyceridic materials typically available at rendering facilities. Those samples belong to what is known as "CAT1 animal fat" category in the rendering industry corresponding to lowest produced quality. Some experiments have been realized on blends of those samples.

Concentrations in phosphorus, and metals (Na, K, Mg, Ca and Fe) present in Sample 1, Sample 2 and Sample 3 are shown in Table 1. The concentration of those elements depend on the sample. Those differences are coming from the type of animals and/or tissues from which those glyceridic materials originate and from the rendering techniques used. To put those concentrations in perspective, typical concentrations for the same contaminants are also listed for crude soybean oil, which is one of the most widespread edible vegetable oil. It must be noted that substantial contaminants variations are also possible for vegetable oils, depending notably on the growing conditions, the variety, the extraction techniques. However, the magnitude of the total contamination found in the samples is in fact fairly comparable to the one of the crude soybean oil. Indeed, as shown in Table 1, the total concentration of the contaminants when compared to the reference crude soybean oil is about the same for the Sample 1, only about 1.5 times higher for the Sample 2 and only about 2 times higher for the Sample 3. Concentration of FFA is considerably higher for all the samples compared to the crude soybean oil reference. However, since FFA is not removed by the process according to the present invention, FFA is not a contaminant stricto sensu.

Consequently, it is legitimate to conjecture that standard refining techniques used in the field of edible vegetable oils, such as the ones applied for the refining of soybean oil, should also be efficient for the refining of low-quality glyceridic materials. Indeed, similar contaminants are found in crude vegetable oil and low-quality glyceridic material such as non-edible animal fats, and furthermore, the magnitude of the total contamination is relatively comparable for those two types of fatty materials. However, as show in Table 2, it has been observed that this is not the case. Even when realizing, on Sample 1, an acid degumming step followed by two successive bleaching steps, the residual phosphorus concentration remains very high (37 ppm) and is considerably superior to the specification needed for feedstock for renewable diesel (max 4 ppm of phosphorus). Of course, the same refining procedures applied on soybean oil would have been successful, resulting in degummed and bleached oil containing only a few ppm of phosphorus and metal cations.

Table 3 confirms that standard refining techniques applied on another sample (Sample 3) are unable to remove the contaminants. The removal rate of the phosphorus element is again very low (only 55.6% is removed) and 35.5 ppm of this element remain even after a succession of one degumming step and two bleaching steps. Table 4 shows that a water washing using high concentration of a strong acid (HCl) is even less efficient than standard refining techniques.

Thus, standard refining techniques directly applied on low-quality glyceridic materials are not able to remove unwanted elements in particular the phosphorus. This is particularly surprizing because phosphorus is reduced efficiently from crude soybean oil even if this crude oil contains substantially more phosphorous than the three samples of low-quality glyceridic materials. Furthermore, the phosphorus reduction observed in the case of low-quality glyceridic materials remains unsatisfactory even if the standard refining techniques are realised with higher concentration of reactants and if some step (such as the bleaching) is applied successively twice which is not the case when crude soybean oil is refined.

However, most surprisingly, it has been observed that the efficiency of the standard refining techniques increases substantially if a thermal treatment is applied to the low-quality glyceridic material before said standard refining techniques are applied. The thermal treatment consists in maintaining the low-quality glyceridic material at high temperature (typically from 160° C. to 280° C.) during a period of 10 to 120 minutes under moderate vacuum or moderate pressure (typically from 300 mbar to 5 bar) and under agitation, typically with a mechanical stirrer rotating between 5 and 60 hertz. The thermal treatment is realized either on native low-quality glyceridic material or optionally after a pre-treatment of said low-quality glyceridic material. Pre-treatments are for example water washing and/or acid washing and/or water degumming and/or acid degumming. In all case no solvent or no chemicals are added to the low-quality glyceridic material during the thermal treatment.

The comparison of the results obtained for Examples 1 to 3 (with no thermal treatment) with the results obtained for Examples 4 to 12 (with a thermal treatment step), demonstrates that most of the contaminants elements, in particular the phosphorus element, are removed with significantly greater efficiency by the standard refining techniques when a thermal treatment is applied on the low quality glyceridic material samples.

Table 4 shows that after a thermal treatment (160° C., 90 min) applied to Sample 1, the phosphorus removal is 91.5% after the first bleaching step. This is compared to a removal of 81.5% after the first bleaching if no thermal treatment is applied on Sample 1 (Table 2). Table 5 shows that if a more intense thermal treatment (180° C., 120 min) is applied to Sample 1, the phosphorus removal is 98% after the first bleaching step and 99% after the second bleaching step. The removal of the metals (Ca, Na, Mg, K, Fe) is also markedly improved. As a matter of fact, the thermal treatment described in Example 4 (Table 5) improves the efficiency of standard refining technique to the extent that in spec feedstock for renewable diesel is produced. Table 5 to Table 15 summarizes the results of several thermal treatment conditions combined with various combinations of standard refining techniques applied on Sample 1, Sample 2 or Sample 3.

In conclusion, the examples show that, when the low quality glyceridic material undergoes a thermal treatment, a very efficient removal of phosphorus and metal ions (Ca, Mg, Fe, Na, K) can be achieved by a succession of standard refining techniques. As a matter of fact, the removal efficiency is approaching 100% for some of those experiments. Such high removal efficiency cannot be reached when the glyceride material does not undergo a thermal treatment. In that latter case, the removal efficiency remains substantially lower than 100% in particular for the phosphorous. Removal of the metals are less improved by the thermal treatment.

The thermal treatment applied to low-quality glyceridic material is advantageous over the currently applied processes because said thermal treatment does not require large investment to be put into practice and, after said thermal treatment is applied, surprisingly, the standard refining techniques such as acid degumming and bleaching become sufficiently efficient to remove substantially most contaminants, in particular phosphorus and metals such as K, Na, Mg, Ca and Fe. The contaminants are thus removed without creating a large waste stream, and furthermore those waste streams are similar to the ones existing in the purification process of edible oils and fats and can thus be treated efficiently with known and existing processes and outlets. The process according to the present invention can thus easily be put in place in any refining facilities processing edible vegetable oils (or edible animal fats) with a minimal investment and at a minimal running cost. The process according to the present invention does not require other chemicals than the ones standardly used in the refining of edible vegetable oils and edible animal fats. Furthermore, the process according to the present invention does not require solvent or large volume of water. Furthermore, the process according to the present invention is quick and typically the full purification can be achieved in a few hours, typically in less than 8 hours and thus considerable faster than some of the existing alternative processes. However, the reason of this observed greater efficiency of the standard refining techniques applied on low-quality glyceridic material if this one undergoes a preliminary thermal treatment is not fully understood.

The following sections describes the preferred parameters of the process according to the present invention.

Temperature During the Thermal Treatment

The main parameter of the thermal treatment is its temperature. Substantial improvement of the contaminants removal efficiency has been observed for thermal treatment realized at temperature ranging between 160° C. and 300° C., preferably at a temperature ranging from 180° C. to 280° C., even more preferably at temperature ranging from 200° C. to 260° C. In general, the higher the temperature of the thermal treatment, the more efficient is the impurities removal by the standard subsequent standard refining techniques steps. However, the temperature of the thermal treatment is preferably lower than 280° C. in order to limit thermal degradation and oxidation of the glyceridic material. As a matter of fact, in the field of oil and fat, it is quite unconventional to heat a glyceridic material at high temperatures unless this glyceridic material has been carefully deaerated and that the heating per se occurs under high vacuum of for example 5 mbar of less. Thus, the thermal treatment, as realised in the present invention, brings not only unexpected results but is also remarkably unconventional because it is common practice and knowledge that a glyceridic material containing large amount of phosphorus contamination must not be heated at high temperature even under high vacuum. As a matter of fact, the deodorization of edible oils and fats is only realized on carefully degummed oils or fats having a phosphorus concentration below 10 ppm and even preferably below 5 ppm. Indeed, deodorization with higher level of phosphorus lead to darken oil with fixed colours that is unfit for edible applications. Thus, the observation of the substantial improvements in the removal of the contaminants such as phosphorus and other metals such as Fe, Ca, Mg, K, Na, by standard refining techniques, after a thermal treatment of low-quality glyceridic materials is particularly unexpected. Indeed, it is common knowledge that heating an oil or fat containing high amount of P irremediably darken and degrade the oil or fat, even if the heating is realized under high vacuum an on a deaerated oil or fat.

After the thermal treatment, the thermally treated low-quality glyceridic material is allowed to cool at temperature of 120° C. or lower. Said cooling is preferably realised in a hermitic vessel or a hermitic heat exchanger to avoid the direct contact with ambient air. At 120° C. the cooled thermally treated low-quality glyceridic material can be subjected to standard refining techniques. As a matter of fact, the temperature of the glyceridic material during such standard refining techniques is usually in the vicinity of 120° C.

Agitation During the Thermal Treatment

Moderate agitation during the thermal treatment is preferably applied in order to homogenize the temperature and avoid sedimentation in the heating vessel. Indeed, in industrial practice, most part of the heating will take place in thermal exchanger where any sedimentation should be avoided at all cost to preserve the efficiency of the equipment. However, agitation should not be too intense to avoid or a least limit the formation of foam which complicate greatly the downstream phases separation steps. It has been found that the moderate mechanical agitation similar to the one applied in a degumming agitation tank is satisfactory and is well known to the skilled artisan. However, our invention is not limited to such moderate agitation and other factors may influence the agitation intensity such as the exact nature of the glyceridic material and the size of the heating vessel, the type of the thermal exchanger and the characteristic of the mechanical agitator. In practice, the thermal treatment of the low-quality glyceridic material is advantageously realized under a rotating mechanical agitation having a frequency ranging from 0.01 to 100 hertz, preferably ranging from 0.1 to 80 hertz, even more preferably ranging from 1 to 60 hertz.

Duration of the Thermal Treatment

Duration of the thermal treatment depends on the selected temperature. The higher the temperature, the shorter will be said thermal treatment. At temperature of 230° C., the thermal treatment of the low-quality glyceridic material is realized during a period of time ranging from 5 to 120 minutes, preferably ranging from 10 to 60 minutes, even more preferably ranging from 15 to 30 minutes. Preferably, the duration should not exceed 60 minutes to avoid thermal degradation of the technical fat and keep the overall process relatively quick and economical. Satisfactory results have been obtained when the duration of thermal treatment was 20 minutes at 230° C.

Pressure During the Thermal Treatment

Pressure during the thermal treatment of the low quality glyceridic material is preferably the adiabatic pressure occurring in a hermetical heating vessel. This situation is the simplest and less expensive technical set up. However, our invention is not limited to such set up and moderate vacuum (such as for example 300 mbar) or higher pressure (such as for example 10 bars) may be advantageous. However, very deep vacuum does not bring any advantage and may even lead to the stripping of FFA which is not wanted. Higher pressure (higher than 10 bars) does not bring any advantage and put unnecessary constrains on the heating vessel. The best range for the pressure during the thermal treatment of the low-quality glyceridic materials, according to the present invention, is between 100 mbar and 10 bar, preferably between 200 mbar and 8 bar and even more preferably between 400 mbar and 6 bar. As a matter of fact, the preferred pressure will be the adiabatic pressure occurring in a closed heating vessel and the experience has shown that in that case the pressure ranges typically from 400 to 6 bars depending on the temperature and the composition of the processed low-quality glyceridic material and if a vacuum has been realised in the hermetic vessel prior to the thermal treatment. Preferably the temperature and pressure of glyceridic material during the thermal treatment are set so that said glyceridic material stay in liquid state including its FFA fraction. This preferred situation is realized in the above-mentioned preferred temperatures and pressures, in particular when the adiabatic pressure that is allowed to build-up in a hermitical heating vessel.

Presence of Reactant(s) and/or Solvent During the Thermal Treatment

Preferably no chemical, no reactant and no solvent are added to the glyceridic material during the thermal treatment. For example, addition of water does not bring any advantage concerning the downstream purification steps and lead to significant hydrolysis of the technical fat which is a clear disadvantage. Adding a chemical bleaching agent, such as bleaching earth, during the thermal treatment is less efficient than making the thermal treatment without any chemical/solvent followed by the purification step involving the bleaching earth used at conventional temperature (about 100° C.). Therefore, the process according to the present invention, preferably includes a thermal treatment of the low-quality glyceridic material realised in absence of any chemical, reactant and/or solvent. As a matter of fact, without willing to be bound to any theory, it is believed that the presence of high concentration of FFA in low-quality glyceridic material may acts as a dispersant and renders the impurities more accessible to the chemicals used during the downstream standard refining steps. In other words, the substantial amount of FFA always present in low-quality glyceridic materials may be considered as internal diluent/dispersant when the correct conditions of temperatures and pressures are met. However, since those FFA are naturally present in the low-quality glyceridic materials and are preferably not removed, said FFA cannot be truly considered as a solvent or reactant, since factual solvent or reactant must be added and later removed as such or as reaction product(s). It is observed that better purification efficiency is achieved for samples containing a higher concentration of FFA and all our sample contain at least 20% of FFA. Therefore, according to our invention, the low-quality glyceridic feedstock contain preferably at least 20% of FFA. Furthermore, those FFA are preferably not removed during the thermal treatment.

Optional Pre-Treatment of the Glyceridic Material Prior to the Thermal Treatment It has been observed that pre-treatments on the low-quality glyceridic materials before the thermal treatment can be advantageous in some circumstances and for example may save chemicals usage during the post thermal treatment standard refining steps. Those pre-treatments include preferably water washing, eventually in presence of small amount of acid such as citric acid and/or water or acid degumming (typically 2% of acid). Such pre-treatment(s) may decrease the overall consumption of chemicals on the full purification process. However, those optional pre-treatment(s) should not reduce the alkalinity of the low-quality glyceridic material to value below 500 ppm. Indeed, it is believed that the natural alkalinity of the low quality glyceridic feedstock, in particular high concentration of K and Na are advantageous during the thermal treatment. If the thermal treatment is realized in presence of this natural alkalinity, or for example 500 ppm or more, then the downstream washing, degumming and bleaching steps where more efficient than when this natural alkalinity is reduced below 500 ppm by a pre-treatment. This alkalinity which is naturally part of the low quality glyceridic material could react with the phospholipids and make them more hydratable. All samples had naturally an alkalinity higher than 500 ppm. Thus, optional pre-treatment should not reduce excessively the natural alkalinity of the low-quality glyceridic feedstock. If the natural alkalinity of the low-quality feedstock is already low, for example having the sum of K and Na below 500 ppm, no pre-treatment is preferred or alternatively, pre-treatment that will not decrease this natural alkalinity. Again, this alkalinity is intrinsic to the low-quality glyceridic feedstock and cannot be considered as an added chemical.

BEST MODE OF THE INVENTION

Given the variability of the low quality glyceridic material, the best mode will be the one giving the targeted purification performances at the lower cost, which mostly correspond to the method using the less chemicals such as citric acid, bleaching earth and silica adsorbent. When dealing with a new batch of low-quality glyceridic material, the strategy to reach this best mode is to start from the following probing sequence: a) pre-treatment including water washing and acid degumming, b) thermal treatment at minimum 230° C. and preferably 260° C. during 20 minutes at adiabatic pressure and under an agitation of 30 rpm and in absence of solvent or added chemical, c) cooling at 100° C., d) acid degumming, e) bleaching with bleaching earth and d) second bleaching with silica adsorbent. In such probing sequence, the treatments (water washing, acid degumming, bleaching steps) are realized in standard conditions, i.e. the conditions that would be used for the refining of soybean oil. From this probing sequence, and according to the purification performances, the process may be adjusted. For example, if the purification performances are above expectations, some step(s) of this probing sequence may be dropped and/or less reactants used if order to decrease the cost of the refining treatments. On other hand, if the purification performances are below expectations, typically one or more treatments will be intensified using for example more chemicals such as citric acid during the degumming and more bleaching reactants during the bleaching steps. Alternatively, several bleaching steps in series may be realized combined with more intense thermal treatment. It is believed that the skilled artisan will be able to determine the best conditions for the purification of low-quality glyceridic material according to the present invention, from this strategy combined with the following examples and this without realizing unnecessary experimentations. Usually, after the thermal treatment of the low-quality glyceridic material, standard purification techniques, are able to remove at least 90% of the phosphorus and at least 95% of the sum of elements Na, K, Mg, Ca and Fe from said low-quality glyceridic material.

EXAMPLES

The present technology will be further described in the following examples, which should be viewed as being illustrative and should not be construed to narrow the scope of the disclosed technology or limit the scope to any particular embodiments.

Samples of Low-Quality Glyceridic Material

Table 1 summarizes the concentration of some major contaminants in typical animal fats that are improper for usage in food and feed applications. To put the level of contamination into perspective, table 1 also list the typical contamination found in crude soybean oil from North American origin. However, such contamination is very detrimental for the hydrodeoxygenation catalyst and thus it is paramount to reduce those contaminants to very low level. The goal is to purify low-quality glyceridic material in an economical way without consuming large quantity of chemical and/or solvent and without generating large volume of waste stream. It is also important to not further degrade the feedstock during the purification step(s), in particular the concentration of FFA should not increase at all or at least not increase markedly. Indeed, even if FFA are converted in renewable diesel during the HVO process, it is not advantageous to increase further the concentration of FFA since at high concentration and high temperature FFA can be corrosive.

TABLE 1

| Contaminants | Sample 1 | Sample 2 | Sample 3 | Crude soybean oil (typical values for refence) |
|---|---|---|---|---|
| FFA [%] [1] | 19.4 | 28 | 29.7 | 1-2 |
| P [ppm] | 346 | 260 | 181 | 900-1200 |
| Fe [ppm] | 121 | 24 | 84 | 2 |
| Ca [ppm] | 273 | 90 | 72 | 30 |
| Mg [ppm] | 55 | 15 | 12 | 45 |
| K [ppm] | 224 | 797 | 1200 | 80 |
| Na [ppm] | 172 | 550 | 1023 | 80 |
| Total [ppm] (except FFA) | 1191 | 1736 | 2572 | 1138-1439 |

[1] FFA is only a contaminant in the case of edible vegetable oils. It must be removed from edible oil to meet organoleptic target.

Example 1

In Example 1, Sample 1 is directly degummed at 90° C. with an aqueous solution of citric acid (3.5 kg/ton of oil) and washed with aqueous solution of sodium hydroxide (0.55 kg/ton of oil). This standard degumming, known in the art as 'acid degumming' only removes 67.3% of the P presents in Sample 1. By comparison only about 5 to 10 ppm of P would remain in degummed soybean oil under same conditions which corresponds to a removal efficiency of in excess of 99%. However, 95.6% of the metals Fe, Ca, Mg, K and Na are removed from the Sample 1 during this degumming step.

Then two standard bleaching operations have been conducted at 100° C. during 30 min and at 100 mbar with 1.5 kg of citric acid and 20 kg of bleaching earth per ton of Sample 1 for the first and second bleaching. Thus, even if a relatively large amount of bleaching earth is used, still a large quantity of P remains in the sample 1:64 ppm after the first bleaching, and 37 ppm after the second bleaching corresponding to a removal efficiency of 81.5% and 89.3%, respectively. This removal efficiency is not satisfactory. For economical reason, it is not desired to conduct a third or fourth bleaching hoping to remove more phosphorus. Indeed, the cost of the bleaching earth and the glyceridic material loss would be prohibitive. Furthermore, it is not likely that a third and fourth bleaching operation would lead to a satisfactory removal of phosphorus. In sharp contrast, a bleaching operation conducted on degummed soybean oil would have led to the removal of nearly all phosphorus. Usually, only 2 to 3 ppm of phosphorus remains in degummed and bleached soybean oil corresponding to a cumulative removal rate of about 99.8%. The two consecutive bleaching operations further removed more metals (Fe, Ca, Mg, Na, K) of the sample 1 and after the second bleaching operation, 14 ppm of said metals remain which correspond to a cumulative removal rate of 98.3% which even if encouraging still fails to deliver the required metal removal efficiency.

Table 2 summarizes the cumulative removal of phosphorus and metals (sum of Fe, Ca, Mg, K, Na) as well as the concentration of those remaining elements after each purification operation. In Table 2, as well as in all tables, "P" means phosphorus, and "Metal" means the sums of the Fe, Ca, Mg, Na, and K.

TABLE 2

| Purification operations | Cumulative P Removal [%] (remaining P [ppm]) | Cumulative Metal Removal [%] (remaining Metal [ppm]) |
|---|---|---|
| Water washing | 18.5% (282 ppm) | 23.8% (643 ppm) |
| Degumming (including washing) | 67.3% (113 ppm) | 95.6% (37 ppm) |
| First Bleaching | 81.5% (64 ppm) | 96.6% (28.8 ppm) |
| Second Bleaching | 89.3% (37 ppm) | 98.3% (14 ppm) |

Example 2

In Example 2, Sample 3 is degummed and bleached two times successively. However, the degumming conditions have been slightly modified. The degumming has been realized at 90° C. with 19 kg of citric acid per ton of fat, which correspond to the molar ratio of the sum of the element K and Na to the amount of citric acid, and the washing after the degumming has been realized with water (without sodium hydroxide). Both bleaching operations are similar to the ones of Example 1.

Table 3 presents the cumulative removal rate of phosphorus and metals (sum of Fe, Ca, Mg, K, Na) as well as the concentration of those remaining elements. It can be seen that the removal of the phosphorus is not satisfactory since only 55.6% of this element is removed even after the second bleaching. The removal of the metals ions (sum of Fe, Ca, Mg, K, Na) was very promising after the acid degumming (99.5% of removal rate with about 15 ppm left). However, it has been observed that the metal concentration increases with the bleaching operation. This is due to leaching of some metals from the bleaching earth. This phenomenon is known but cannot be fully explained. It is possible that the presence of high concentration of FFA (about 30%) plays a role in this phenomenon. In conclusion, for this sample containing a large fraction of FFA, the removal of phosphorus, and to a lower extend the removal of metals ions (Fe, Ca, Mg, K, Na) remains problematic.

TABLE 3

| Purification operations | Cumulative P Removal [%] (remaining P [ppm]) | Cumulative Metal Removal [%] (remaining Metal [ppm]) |
|---|---|---|
| Degumming (including washing) | 22.5% (62 ppm) | 99.5% (14.8 ppm) |
| First Bleaching | 41.3% (47 ppm) | 99.3% (21.5 ppm) |
| Second Bleaching | 55.6% (35.5 ppm) | 99.2% (22 ppm) |

Example 3

In Example 3, a blend of the three samples were degummed with aqueous solution of hydrochloric acid. The first trial has been realized with a molar ratio of 1:1 between the hydrochloric acid and the metals ions (Fe, Ca, Mg, K, Na) and a second trial has been done with a molar ratio in excess of 30%. Both trials have been done with 5% of water. Results are shown in Table 4.

TABLE 4

| Purification operations | Cumulative P Removal [%] (remaining P [ppm]) | Cumulative Metal Removal [%] (remaining Metal [ppm]) |
|---|---|---|
| HCl washing (1:1) | 17.8% (143 ppm) | 76.9% (537.8 ppm) |
| HCl (1:1.3) | 39.7% (105 ppm) | 98.2% (43 ppm) |

This example shows that even a very strong acid such as hydrochloric acid is unable to remove the impurities contained in a blend of various samples of low-quality glyceridic material. Since Examples 1 and 2 showed that standard purification techniques as used during the refining of edible vegetable and animal oils and fats failed to satisfactory purify technical fat, and even degumming with stronger acid failed as well, it is obvious that this strategy should be abandoned and that logically dedicated procedures should be developed. However, it has most surprisingly been observed that heating the technical fat at a high temperature (160° C. to 260° C.) in various conditions, but in all case is absence of any chemicals and/or solvent lead to a much more efficient removal of all the contaminants even when subsequently standards purification techniques are applied. This thermal treatment can be applied before any standard treatment(s) is/are applied on the technical fat or after one or more preliminary standard treatments such as a washing or degumming for example. By standard treatments, reference is made to the purification and refining treatment applied during the refining of edible vegetable/animal oils and fats. Those standard treatments are well known by the skilled artisan. Examples 4 to 14 will describe several variations of those standard treatments.

Example 4

In Example 4, Sample 1 is first heated at 160° C. during 90 minutes under 300 mbar is absence of any chemical or solvent. Moderate mechanical agitation is applied. After the heating the Sample 1 has been cooled to 85° C., washed with 3% water and centrifuged at 2000 G for 10 minutes. After water washing, the Sample 1 has been further degummed with an aqueous solution of citric acid and bleached with 2% of bleaching earth. Results are shown in Table 5.

TABLE 5

| Purification operations | Cumulative P Removal [%] (remaining P [ppm]) | Cumulative Metal Removal [%] (remaining Metal [ppm]) |
|---|---|---|
| Water washing after heat treatment | 67.9% (109 ppm) | 55.8% (373 ppm) |
| Degumming | 81.8% (63 ppm) | 96.2% (32 ppm) |
| Bleaching | 91.9% (28 ppm) | 97.9% (18 ppm) |

The comparison of Table 1 and Table 5 shows clearly that a thermal treatment improves greatly, and most surprisingly, the efficiency of standard treatment such as water washing, degumming and bleaching for what P and metal removal concerns. After the thermal treatment of the Sample 1, the removal of phosphorus by the degumming operation increased from 67% to 81.8% and the removal of the metal increases from 95.6% to 96.2%. Improvement of the removal of the same magnitude is also observed for the bleaching operation. The improvement of the removal rate of phosphorus is much more marked than the improvement of the removal efficiency of the metals. The reason of this improvement is unknown. It is possible that the thermal treatment modifies the phosphorus-containing impurities and make them more water soluble or accessible to the reactants used in the various subsequent purification steps. The metals sensitivity to the standard purification steps seem less modified by the thermal treatments.

Example 5

In Example 5, 600 g of Sample 1 was heated in a Rotary Vapor Unit at 180° C. for 120 minutes at 300 mbar in absence of any chemical reactant and/or solvent. Rotation of the vessel containing the crude technical fat was 60 RPM. After the heat treatment, the Sample 1 was cooled to 85° C. and acid degummed with 3.5 kg/ton citric acid, 0.43 kg/ton NaOH (both HSM with Ultraturax) and 2% total water, maturated for 20 min and then centrifuged at 2000×G for 10 min. Degummed Sample 1 was double bleached with the bleaching earth Clariant 9192 (ABE) in the same condition than in Example 4 (but realized two times). Thus, Example 5 is similar to Example 4, but the later is realized with a more intense thermal treatment and without water washing.

Results shown in Table 6 indicates that a more intense thermal treatment of the glyceridic material induces an even better removal of the impurities by the post standard purifications steps. Removal rates are higher after the degumming and after the first bleaching even if no water washing has been realized.

TABLE 6

| Purification operations | Cumulative P Removal [%] (remaining P [ppm]) | Cumulative Metal Removal [%] (remaining Metal [ppm]) |
|---|---|---|
| Degumming (including washing) after heat treatment | 94.4% (19 ppm) | 98.1% (16 ppm) |
| First Bleaching | 98.0% (6.8 ppm) | 99.2% (7 ppm) |
| Second Bleaching | 99.0% (3.3 ppm) | 99.3% (6 ppm) |

Example 6

Example 6 is similar to Example 5 but the Sample 1 has been thermally treated under 50 mbar instead of under 300 mbar as in Example 5. Temperature and duration and agitation were the same. Purifications steps were the same but only one bleaching has been realized. Results shown in Table 7 indicate that lower pressure during the thermal treatment of the technical fat brings no benefit for the removal of the impurities. Nevertheless, the thermal treatment per se is still improving the removal of the impurities compared to a similar purification procedure including no thermal treatment.

TABLE 7

| Purification operations | Cumulative P Removal [%] (remaining P [ppm]) | Cumulative Metal Removal [%] (remaining Metal [ppm]) |
|---|---|---|
| Degumming | 89.1% (38 ppm) | 95.9% (14 ppm) |
| Bleaching | 95.9% (14 ppm) | 98.8% (10 ppm) |

Example 7

Example 7 aims at the comparison of two degumming acids combined to initial thermal treatment. Sample 1 has been preheated at 180° C. during 120 minutes under 700 mbar and then degummed with citric acid or with phosphoric acid. Except the nature of the acid used in during the degumming, the other conditions were similar. Results are shown in Table 8. From Table 8, it can be observed that the removal of phosphorus is identical for the two acids, but metal ions are much more efficiently removed with citric acid. It is supposed that the chelating effect of citric acid is conductive to higher removal efficiency. It is unknown why this chelating effect does not operate on phosphorus. However, Example 7 clearly shows that citric acid is preferably used in all degumming operation and water washing in acidic conditions.

TABLE 8

| Purification operations | Cumulative P Removal [%] | Cumulative Metal Removal [%] |
|---|---|---|
| Degumming with Citric Acid | 94.9% | 98.3% |
| Degumming with Phosphoric Acid | 94.9% | 69.3% |

Example 8

In Example 8, Sample 1 has been treated and purified in the same condition that in Example 5 but 3% of water was added to the glyceridic material during the thermal treatment and the heating has been realised in a closed reactor (PARR) under mechanical agitation (60 RPM) and in adiabatic conditions corresponding to a pressure of 4.6 bar. Results show that addition of water brings no benefit to the purification of the glyceridic material. However, the FFA concentration of the glyceridic material increased from 28% to 34% during the thermal treatment in presence of added water. Since it is preferred not to increase the FFA content during any purification treatment water is preferably not mixed with the glyceridic material during the thermal treatment. As a matter of fact, best purification performances of standard purification methods have been observed when no chemicals and/or no solvent and/or no water are mixed with the low-quality glyceridic material during its thermal treatment prior to said standard purification methods. It must be mentioned that in all the other experiments, the thermal treatment has been realized in absence of water (and in absence of any solvent or added chemical). In those conditions, the amount of FFA initially present in the low-quality glyceridic material did not increased much. A moderate increase of the FFA concentration of 1 to 2% has been observed when the thermal treatment is realised at higher temperature (260° C.). At such high temperature even trace of water will induce hydrolysis of glyceridic material. As a matter of fact, no thermal treatment has induced a decrease of the FFA concentration in the thermally treated low-quality glyceridic feedstock.

Example 9

In Example 9, the influence of a washing with acidified water before the thermal treatment of the glyceridic material has been investigated. After this initial washing and subsequent centrifugation realized on Sample 2, thermal treatment was done at 180° C. during 120 minutes under 700 mbar, again without added chemicals, solvent or water. Subsequently, the obtained thermally treated sample has been split in two batches. The first batch was degummed under standard conditions and then bleached with bleaching earths. The second batch was treated according to the same procedure, but with a slightly modified degumming. Table 9 and Table 10 show the obtained results for the standard degumming and for the slightly modified degumming procedure respectively. In the standard degumming procedure, the oil is washed with an alkalinized water solution after the degumming operation per se. In the slightly modified degumming procedure, the oil is washed with pure water. This slightly modified procedure is thus simpler and more economical since no base is needed. It is understood that such modification of the degumming procedure is totally usual in the refining of edible oil. Indeed, this type of water washing is realised for oil requiring only a water degumming or when the following bleaching is realized with acid activated bleaching earth. Indeed, in that case some remaining acidy in the oil after the degumming step is not problematic at all.

Table 9 and Table 10 indicate that the concept of the pre-washing of the low-quality glyceridic material prior to the thermal treatment is beneficial for the removal of the impurities. Indeed, removal efficiency is quite close to 100% after the second bleaching. Skipping the caustic neutralisation after the acid degumming seems also beneficial for both the removal of phosphorus and the ions metals.

TABLE 9

| Purification operations | Cumulative P Removal [%] | Cumulative Metal Removal [%] |
| --- | --- | --- |
| Initial washing | 43.3 | 61.9 |
| Heat treatment | — | — |
| Degumming (standard) | 93.2 | 96.9 |
| First Bleaching | 95.8 | 99.3 |
| Second Bleaching | 97.7 | 99.5 |

TABLE 10

| Purification operations | Cumulative P Removal [%] | Cumulative Metal Removal [%] |
| --- | --- | --- |
| Initial washing | 43.3 | 61.9 |
| Heat treatment | — | — |

TABLE 10-continued

| Purification operations | Cumulative P Removal [%] | Cumulative Metal Removal [%] |
| --- | --- | --- |
| Degumming (including water wash instead of alkalinized water wash as in standard degumming) | 93.2 | 99.1 |
| First Bleaching | 96.7 | 99.3 |
| Second Bleaching | 98.3 | 99.7 |

Example 10

In Example 10, the influence of citric acid wash (1% in water, 90° C.) before the heat treatment realized on Sample 3. Metals are particularly efficiently removed. However, such citric acid wash does not induce a marked improvement of the phosphorus removal. Table 11 shows the obtained results.

TABLE 11

| Purification operations | Cumulative P Removal [%] | Cumulative Metal Removal [%] |
| --- | --- | --- |
| Initial acid washing | 3.7% | 11.7% |
| Heat treatment | — | — |
| Degumming (water washing) | 88.6% | 99.5% |
| First Beaching | 92.7% | 99.3% |
| Second Bleaching | 95.1% | 99.5% |

Example 11

In Example 11, the effects of thermal treatment realised at higher temperature (260° C.) is investigated. After the thermal treatment, the heated low-quality glyceridic material is split in two fractions. The first fraction has been washed with water acidified with 2% of citric acid ("CA washing) and the second fraction has been washed with a water acidified with 2% of sulfuric acid It is observed a significant improvement of the removal rate given by simple CA washing after a thermal pre-treatment at 260° C. during 20 minutes at adiabatic pressure in a closed PARR reactor. Washing with sulfuric acid give slightly different results but still very good after the washing step per se and very good after the bleaching with ABE and a second bleaching with Trisyl. As a matter of fact, removal efficiency is close to 100%. Sulfuric acid is probably more advantageous for the purification of low-quality glyceridic material as this one is considerably less expensive than citric acid. Table 12 and Table 13 show the obtained results.

TABLE 12

| Purification operations | Cumulative P Removal [%] | Cumulative Metal Removal [%] |
| --- | --- | --- |
| Thermal treatment (260° C.) | — | — |
| Washing (water with 2% CA) | 97.7% | 99.2% |
| Bleaching ABE 2% | 99.3% | 99.2% |
| Silica Trisil 0.5% | 99.35% | 99.6% |

TABLE 13

| Purification operations | Cumulative P Removal [%] | Cumulative Metal Removal [%] |
|---|---|---|
| Thermal treatment (260° C.) | — | — |
| Washing (water with 2% sulfuric acid) | — | 99.1% |
| Bleaching ABE 2% | 99.1% | 99.5% |
| Silica Trisyl 0.5% | 99.2% | 99.7% |

Example 12

In Example 12, the influence of an acid washing (2% acid water solution) done before heat treatment has been investigated. It seems the that acid washing realized before a thermal treatment is less efficient as compared to results of Example 11. Removal efficiency of the metal is approaching 100% but the satisfactory removal of the phosphorus cannot be obtained with this purification procedure. Table 14 shows the obtained results.

TABLE 14

| Purification operations | Cumulative P Removal [%] | Cumulative Metal Removal [%] |
|---|---|---|
| Washing with CA solution | 45.3% | 73.6% |
| Thermal treatment 260° C. | — | — |
| Water washing | 92.3% | 72.5% |
| Or washing with CA solution | 97.2% | 95.7% |
| Or washing with sulfuric acid (SA) solution | 92.3% | 99.3% |

Example 13

In Example 13, the influence of a washing with aqueous solution of sulfuric acid prior the thermal treatment is investigated. The conclusions are similar to the ones of Example 12. Table 15 shows the obtained results.

TABLE 15

| Purification operations | Cumulative P Removal [%] | Cumulative Metal Removal [%] |
|---|---|---|
| Washing with SA solution | 51.6% | 86.8% |
| Thermal treatment 260° C. | — | — |
| Water washing | 92.2% | 89.9% |
| Or washing with SA solution | 87.8% | 99.4% |

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method for the purification of low-quality glyceridic material to yield a purified glyceridic material, said low-quality glyceridic material containing triglycerides, partial glycerides, free fatty acids and P, Na, K, Mg, Ca and Fe, said purification process including:
 (a) a thermal treatment of the low-quality glyceridic material at a temperature of at least 160° C., to yield a thermally treated low-quality glyceridic material,
 (b) allowing to cool the thermally treated low-quality glyceridic material of step a) at a temperature of 120° C. or lower to yield a cooled thermally treated low-quality glyceridic material, and
 (c) applying one or more standard refining technique(s) to said cooled thermally treated low-quality glyceridic material of step b),
 wherein said low-quality glyceridic material contain at least 500 ppm of alkalinity,
 wherein prior to the thermal treatment, the method further comprises a pre-treatment that does not decrease the natural alkalinity of the low-quality glyceridic feedstock below an alkalinity of 500 ppm,
 wherein said method is devoid of an FFA stripping step,
 wherein said one or more standard refining technique(s) include water washing, acidulated water washing, water degumming, acid degumming, bleaching realized with bleaching agent(s),
 wherein said thermal treatment of the low-quality glyceridic material is realized in a hermitical vessel under pressure ranging from 100 mbar to 10 bar.

2. The method according to claim 1, wherein said method removes at least 90% of the phosphorus and at least 95% of the sum of elements Na, K, Mg, Ca and Fe from said low-quality glyceridic material.

3. The method according to claim 1, wherein said thermal treatment of the low-quality glyceridic material is occurring in absence of any solvent and further in absence of any reactant.

4. The method according to claim 1, wherein said thermal treatment includes heating the low-quality glyceridic material at a temperature ranging from 160° C. to 300° C.

5. The method according to claim 1, wherein said thermal treatment of the low-quality glyceridic material is realized during a period of time ranging from 5 minutes to 120 minutes.

6. The method according to claim 1, wherein said thermal treatment of the low-quality glyceridic material is realized in the hermitical vessel under a pressure ranging from 200 mbar to 8 bar.

7. The method according to claim 1, wherein said thermal treatment of the low-quality glyceridic material is realized under a rotating mechanical agitation having a frequency ranging from 0.01 to 100 hertz.

8. The method according to claim 1, wherein the low-quality glyceridic material is at least partially water washed prior said thermal treatment.

9. The method according to claim 1, wherein the low-quality glyceridic material is at least partially washed with an aqueous acidic solution prior said thermal treatment.

10. The method according to claim 1, wherein the low-quality glyceridic material is at least partially degummed prior to said thermal treatment.

11. The method according to claim 1, wherein said low-quality glyceridic material contain at least 5% of FFA.

12. The method according to claim 1, wherein said low-quality glyceridic material contain at least 500 ppm of alkalinity, said alkalinity being defined at the sum of Na, K, Mg, Ca and Fe.

13. The method according to claim 1, wherein said method further includes a filtration step, said filtration step removing solid particles.

14. The method according to claim 13, wherein said filtration step includes using a filter aid.

15. The method according to claim 1, wherein said low-quality glyceridic materials include waste oils or fats of vegetable or animal origins, recycled oils or fats of vegetable or animal origins, rendered animal fats, acid oils.

* * * * *